United States Patent [19]

Kervagoret

[11] Patent Number: 4,637,208
[45] Date of Patent: Jan. 20, 1987

[54] HYDRAULIC ASSISTANCE DEVICE FOR BRAKING

[75] Inventor: Gilbert Kervagoret, Argenteuil, France

[73] Assignee: Societe Anonyme D.B.A., Paris, France

[21] Appl. No.: 724,142

[22] Filed: Apr. 17, 1985

[30] Foreign Application Priority Data

Apr. 26, 1984 [FR] France .................. 84 06583

[51] Int. Cl.$^4$ ............................................. B60T 13/00
[52] U.S. Cl. .................................... 60/547.1; 60/566; 60/556
[58] Field of Search ................... 60/547.1, 555, 556, 60/560, 563, 565, 566

[56] References Cited

U.S. PATENT DOCUMENTS

| | | | |
|---|---|---|---|
| 3,514,163 | 5/1970 | MacDuff | 60/555 |
| 3,729,235 | 4/1973 | Bach | 60/555 |
| 3,729,931 | 5/1973 | Shilton | 60/555 |
| 3,798,905 | 3/1974 | Tennis | 60/555 |
| 4,285,198 | 8/1981 | Budecker | 60/547.2 |
| 4,449,369 | 5/1984 | Dauvergne | 60/556 |
| 4,455,830 | 6/1984 | Gaiser | 60/578 |
| 4,455,831 | 6/1984 | Machara | 60/574 |

FOREIGN PATENT DOCUMENTS 2942979 5/1981 Fed. Rep. of Germany .
2274481 1/1976 France .

Primary Examiner—Abraham Hershkovitz
Attorney, Agent, or Firm—Larry J. Palguta; Ken C. Decker

[57] ABSTRACT

Hydraulic assistance device incorporating a casing provided with a bore in which a first piston is mounted so as to slide, the piston being able to move under the effect of a brake pedal between a first position, isolating a first chamber which is joined to the brakes of the vehicle, from a source of high pressure fluid, and a second position, causing the first chamber to communicate with the high pressure source, the device also incorporating a second chamber formed in the casing, a passage joining the first and second chambers and a valve mechanism in the passage in such a way that the passage is normally closed, under the effect of the pressure in the second chamber, characterized in that the device incorporates a second passage, causing the second chamber to communicate with a low pressure reservoir, and a second valve mechanism in the passage, the valve mechanism being sensitive to the pressures in the first and second chambers in such a way that the passage normally remains closed during the operation of the device, while allowing fluid to pass from the second chamber to the reservoir when braking is released.

10 Claims, 1 Drawing Figure

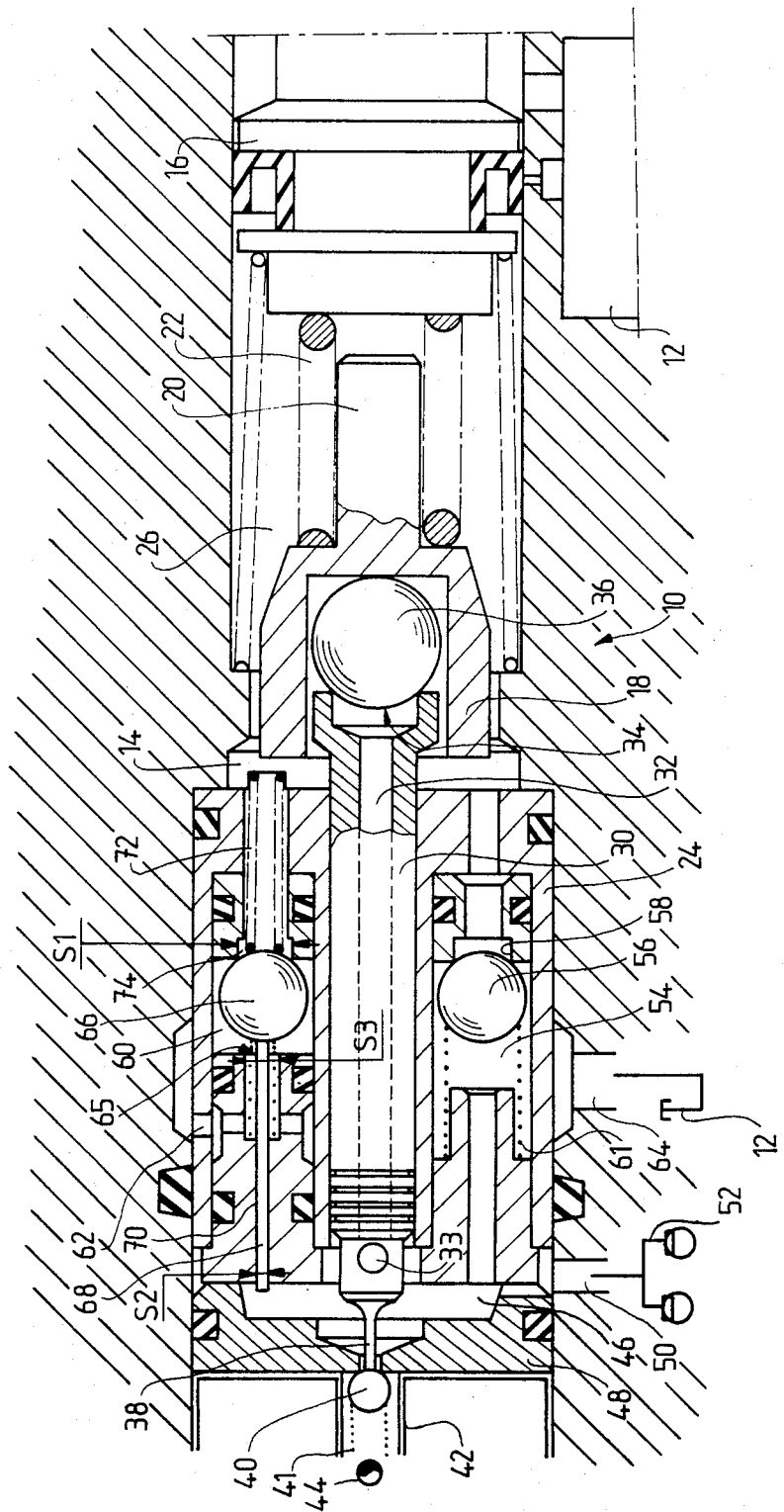

HYDRAULIC ASSISTANCE DEVICE FOR BRAKING

The present invention concerns hydraulic assistance devices and more particularly such a device for a braking circuit with mixed hydrodynamic (more commonly referred to by the term "full power") and hydrostatic operation.

A hydraulic assistance device of the type known as "full power" is known from French Patent Application 83-03,105 in the name of the applicant company, the device being capable of operating as a conventional master cylinder in the hydrostatic mode in the case of failure of the high pressure circuit. The device incorporates an annular cup which separates a first pressure chamber from a second chamber which is joined to the brakes of the vehicle and which is capable of being joined to the high pressure source. In the case of failure of the high pressure circuit, when the device is put into operation, a piston, which limits the first chamber, moves and compresses the fluid in the first chamber, which causes the cup to tilt and allows the fluid under pressure to pass towards the brakes.

Despite its obvious advantages, the system has slight disadvantages, however, in that its construction requires numerous passages in the piston and in some associated components.

The aim of the invention is thus to propose a hydraulic assistance device of the type known as "full power" which is capable of operating as a conventional master cylinder in the case of failure of the high pressure circuit, which is of simple construction, of improved reliability and whose costs of manufacture are low.

To achieve this, the invention concerns a hydraulic assistance device incorporating a casing provided with a bore in which a first piston is mounted so as to slide, the piston being able to move under the effect of a brake pedal between a first position, isolating a first chamber which is joined to the brakes of the vehicle from a source of high pressure fluid, and a second position causing the first chamber to communicate with the high pressure source; the device also incorporating a second chamber formed in the casing, a passage joining the first and second chamber and a valve means in the passage in such a way that the passage is normally closed, under the effect of the pressure in the second chamber, characterized in that the device incorporates a second passage causing the second chamber to communicate with a low pressure reservoir and a second valve means in the passage, the valve means being sensitive to the pressures in the first and second chambers in such a way that the passage remains normally closed during the operation of the device while allowing fluid to pass from the second chamber to the reservoir when braking is released.

Other characteristics and advantages of the present invention will emerge from the following description of an embodiment given by way of illustration, but not limiting in any way, with reference to the accompanying drawing, in which:

the single FIGURE shows a view in partial longitudinal section of a hydraulic assistance device according to the invention.

As shown in the FIGURE, the hydraulic assistance device incorporates a casing 10 on which a low-pressure reservoir 12 for hydraulic fluid is mounted. The casing incorporates a bore 14 in which a piston 16 is mounted so as to slide and to be capable of being actuated by a brake pedal (not shown). A cage forming a housing 18 is mounted in the bore 16 and incorporates a pushrod 20, around which a helical spring 22 is situated. A sleeve 24 is mounted so as to be fixed in the bore 14 of the casing 10 and defines with the piston 16 a first pressure chamber 26. A control piston 30 is mounted in a central bore 28 of the sleeve 24 so as to slide with very slight clearance, the control piston 30 incorporating an axial passage 32 joined to an orifice 33. The passage 32 is provided with a valve seat 34 whose internal diameter is equal to the diameter of the control piston 30. The seat 34 co-operates with a ball valve 36 which is retained, with slight clearance, in the housing 18. The control piston 30 also incorporates a pushrod 38 which bears, during a movement of the control piston 30 to the right (looking at the drawing), against a ball valve 40 and lifts the latter from its seat 42, against which the ball valve 40 is normally pushed by a spring 41. Opening the ball valve 40 allows fluid from a high-pressure source 44 to pass into a second pressure chamber 46 defined between the sleeve 24 and a plug 48. The second chamber 46 is joined by an orifice 50 to the brakes 52 of the vehicle.

The sleeve 24 also incorporates a stepped bore 54 which joins the first and second pressure chambers 26, 46 and which is normally closed by a ball valve 56 which is pushed towards its seat 58 by a weak spring 61. The sleeve 24 incorporates, in addition, a third stepped bore 60 which is joined by an opening 62 in the wall of the sleeve 24 to an annular space which is in hydraulic communication through an opening 64 with the low pressure reservoir 12. A ball valve 66 is mounted in the bore 60, the ball valve bearing against a needle 68 of small diameter which slides with very slight clearance in an associated bore 70. A spring 72 is mounted freely in the bore 60, comes into abutment against the ball 66 and normally projects into the first chamber 26. The diameter S1 of the bore 60 in the region where it forms a seat 74 for the ball valve 66 is considerably greater than the diameter S2 of the needle 68.

When the device is put into operation, in normal operation the piston 16 moves towards the left and through the intermediary of the spring 22 causes the housing 18 to move. The movement of the housing causes the closure of the ball valve 36, and through the intermediary of the control piston 30, opens the ball valve 40 which allows fluid under pressure to pass through the orifice 50 towards the brakes 52 of the vehicle. The pressure in the second chamber 46, which during braking is several times greater than that in the first chamber 26, acts upon the needle 68 and holds the ball valve 66 in its closed position. The ball valve 56 remains closed, under the effect of the high pressure fluid which passes from the second chamber 46 into the bore 54. The fluid under pressure also acts through the control piston 30 and the ball valve 56 upon the housing 18, and thus develops the force to counterbalance the force provided by the brake pedal. Thus a fully determined braking pressure corresponds to each control force.

The movement towards the left (in the drawing) of the piston 16 of the master cylinder drives the fluid in the chamber 26 back towards the reservoir through the valve 66 in such a way that the pressure $\pi$ in the chamber 26 is equal to the braking pressure $X (Sr)/(S1)$. This pressure $\pi$ serves as pedal sensation pressure by acting on the cross-section of the piston 16.

When the brake pedal is released, the piston 16 comes back towards the right under the effect of the various pretensioning. The braking pressure discharges through the ball valve 36 into the first pressure chamber 26 and this surplus fluid passes through the ball valve 66 and the opening 62 towards the low-pressure reservoir 12. If the release is interrupted at a particular position, the ball valve 36 re-closes and the braking pressure stabilizes at the corresponding value.

In the case of failure of the high pressure circuit, for example if the pump or the accumulator is out of action, a valve (not shown) upstream of the ball valve 40 closes and isolates the device from the high pressure circuit. When the brakes are applied, the housing 18 comes into abutment against the sleeve 24, compressing the spring 72 which holds the ball valve on its seat 65 and closes the bore 60 isolating the first chamber 26 from the reservoir 12. The ball valve 66 remains closed while the pressure in the first chamber rises under the effect of the movement of the piston 16. The fluid under pressure opens the ball valve 56 and passes through the bore 54 towards the brakes 52. The device operates as a conventional master cylinder. Upon release, the brakes discharge into the first chamber 26, and from there towards the reservoir 12; passing through the valve 34 which has become inoperative as soon as the housing 18 is in contact with the sleeve 24, owing to the fact that the ball of the valve 36 is almost free.

The braking device described above is intended for a braking circuit. In practice, a system would be provided incorporating two identical devices, each associated with a respective braking circuit. In the latter case, the two devices are advantageously situated in the same casing.

I claim:

1. A hydraulic assistance device including a casing provided with a bore in which a first piston is mounted so as to slide and be capable of moving under the effect of a brake pedal between a first position in which a first chamber which is joined to brakes of a vehicle is isolated from a high pressure source of fluid and a second position in which the first chamber communicates with the high pressure source, the device including a second chamber formed in the casing, a first passage joining the first and second chambers and first valve means in the first passage so that the passage is normally closed under the effect of pressure in the first chamber, characterized in that the device includes a second passage permitting the second chamber to communicate with a low pressure reservoir and second valve means disposed in the second passage, the second valve means being sensitive to pressures in the first and second chambers so that the second passage normally remains closed during operation of the device but allowing fluid to pass from the second chamber toward the reservoir during release of braking, the device including a sleeve in the bore to separate the first chamber from the second chamber and which includes two bores which comprise the first and second passages each associated with a respective one of the valve means.

2. The device according to claim 1, characterized in that the second valve means has a surface area exposed to the first chamber and which is smaller than a surface area which is exposed to the second chamber.

3. The device according to claim 2, characterized in that the second valve means comprises a ball valve which includes actuating means that projects through the sleeve.

4. The device according to claim 3, characterized in that the first valve means includes a ball valve.

5. The device according to claim 4, characterized in that the device includes a control piston slidably mounted in a central bore of the sleeve.

6. The device according to claim 5, characterized in that the control piston includes an axial passage communicating with the first chamber.

7. The device according to claim 6, characterized in that the control piston includes a housing having a ball valve engaging an end of the axial passage.

8. The device according to claim 5, characterized in that the control piston and first piston have resilient means disposed therebetween.

9. The device according to claim 3, characterized in that the actuating means comprises a needle having a spring disposed thereabout.

10. The device according to claim 1, characterized in that each bore in the sleeve includes a spring biasing a respective valve means.

* * * * *